(12) United States Patent
Degady et al.

(10) Patent No.: US 6,558,727 B2
(45) Date of Patent: May 6, 2003

(54) HIGH PRECISION MULTIPLE-EXTRUSION OF CONFECTIONARY PRODUCTS

(75) Inventors: Marc Degady, Morris Plains, NJ (US); Bharat Jani, East Brunswick, NJ (US); Leslie Frank Knebl, Sarasota, FL (US)

(73) Assignee: Warner-Lambert Company, Morris Plains, NJ (US)

(*) Notice: Subject to any disclaimer, the term of this patent is extended or adjusted under 35 U.S.C. 154(b) by 0 days.

(21) Appl. No.: 09/965,153

(22) Filed: Sep. 27, 2001

(65) Prior Publication Data

US 2002/0136812 A1 Sep. 26, 2002

Related U.S. Application Data (60) Provisional application No. 60/262,919, filed on Jan. 19, 2001.

(51) Int. Cl.[7] .............................. A23G 3/00; A23P 1/00
(52) U.S. Cl. ................ 426/516; 425/126.2; 425/133.1; 426/5; 426/91
(58) Field of Search ....................... 426/516, 5, 91, 426/660; 425/5, 126.2, 133.1, 527

(56) References Cited

U.S. PATENT DOCUMENTS

| | | | |
|---|---|---|---|
| 3,857,963 A | * 12/1974 | Graff et al. | 426/5 |
| 4,329,369 A | * 5/1982 | Tezuka et al. | 426/3 |
| 4,399,154 A | * 8/1983 | Puglia et al. | 426/5 |
| 4,968,511 A | * 11/1990 | D'Amelia et al. | 426/6 |
| 4,975,288 A | * 12/1990 | Hager et al. | 426/5 |
| 5,019,404 A | 5/1991 | Meisner | |
| 5,045,325 A | * 9/1991 | Lesko et al. | 426/5 |
| 5,135,760 A | * 8/1992 | Degady et al. | 426/5 |

FOREIGN PATENT DOCUMENTS

| | | |
|---|---|---|
| EP | 0 601 194 A | 6/1994 |
| EP | 0 775 448 A | 5/1997 |

* cited by examiner

Primary Examiner—George C. Yeung

(57) ABSTRACT

A three-phase center-filled candy product. A candy material for the outer layer or shell is extruded from a first extruder and a second material which could be a chewy material, such as gum or bubble gum, is extruded as an inner layer from a second extruder. A semi-liquid center-fill material is inserted into the inner layer. The three-phase rope of material is formed into individual pieces or tablets of candy in a forming machine. Sticks can be added to form lollipops in one embodiment. The formed products are then cooled, tumbled and prepared for further processing.

32 Claims, 6 Drawing Sheets

FIG.16

HIGH PRECISION MULTIPLE-EXTRUSION OF CONFECTIONARY PRODUCTS

CROSS REFERENCE TO RELATED APPLICATION

This application claims the benefit of Provisional Patent Application Ser. No. 60/262,919 filed on Jan. 19, 2001 entitled "Three Component Co-Extruded Center-Filled Gum Lollipop With Hard Candy Shell."

TECHNICAL FIELD

The present invention relates to center-filled confectionery products, such as hard candy lollipops with liquid-filled gum center inserts.

BACKGROUND OF THE INVENTION

Hard shelled candy products with a center material or insert of a different material are known. Two-phase products of this type include "Tootsie Pops" which have a hard candy outer layer and a softer (chewy) candy filling in the center. Another known two-phase product is the "Blow Pop," which has a hard candy shell and a bubble-gum filling in the center.

There also are a number of two-phase gum products on the marketplace, such as "Bubbaloo" and "Freshen-Up". These individual gum pieces have an outer shell with a soft or syrup-like center filling or core.

To date, it has not been possible to produce a commercially acceptable three-phase candy product with a semi-liquid core due to difficulties in constraining the semi-liquid core from leaking during manufacture of the product (and for a lollipop product, insertion of the stick). There are no lollipop products on the market today which have a three-phase constituency, that is, which have three distinct layers or areas of different materials, one of which is a semi-liquid-type material.

SUMMARY OF THE INVENTION

It is an object of the present invention to provide an improved candy or confectionery making process. It is also an object of the present invention to provide a system and process for making semi-liquid center-filled confectionery products, such as lollipops.

It is a further object of the present invention to provide a system and method for producing a candy product with three distinct materials or phases. It is a still further object of the present invention to provide a system and process for making a three-phase candy product in which one of the phases is a semi-liquid-type material.

In accordance with the present invention, an improved system and process are provided for making a center-filled candy product, the candy product being filled with both a middle layer of a hard or chewy material and a center layer (core) of a semi-liquid type material. The three layers or phases of the candy product are co-extruded into a three-component "rope" of material. Either a single co-extrusion machine or two separate extruders are utilized in order to extrude a material with a hard candy exterior layer and an inner hard or chewy (e.g. gum) layer. In addition, a semi-liquid material is inserted into the inner layer either concurrently with or immediately after the formation of, the co-extruded confectionery components.

The three-phase product is fed through a rope sizing mechanism and into a rotary or chain-type final tablet forming mechanism. The three-phase extruded product is formed into individual pieces or tablets of candy. If desired, lollipop sticks can be inserted into the pieces as they are processed in order to form lollipops. The final products are transferred to a cooling tunnel or mechanism where they are shaken (tumbled) and cooled. Once the process is completed, the products are sent to storage for further processing or to a separate department for immediate packaging and shipping.

The present invention provides a flavor release across all three layers or phases which improves the sensory effect to the consumer. The hard candy exterior provides a first satisfying flavor as it dissolves. The gum or chewy inner layer provides a chewing attribute together with an additional flavor release. The semi-liquid center fill provides a sudden and high impact of acid and quick dissolution with a sense of surprise and satisfaction. Finally, if bubble gum is utilized as the inner layer, the gum allows the consumer to continue to blow bubbles even after some of the flavors are released and consumed.

Further benefits, features and details of the invention will become apparent from a review of the following description, when taken in view of the accompanying drawings and appended claims.

DESCRIPTION OF THE PREFERRED EMBODIMENTS

Figure 1:
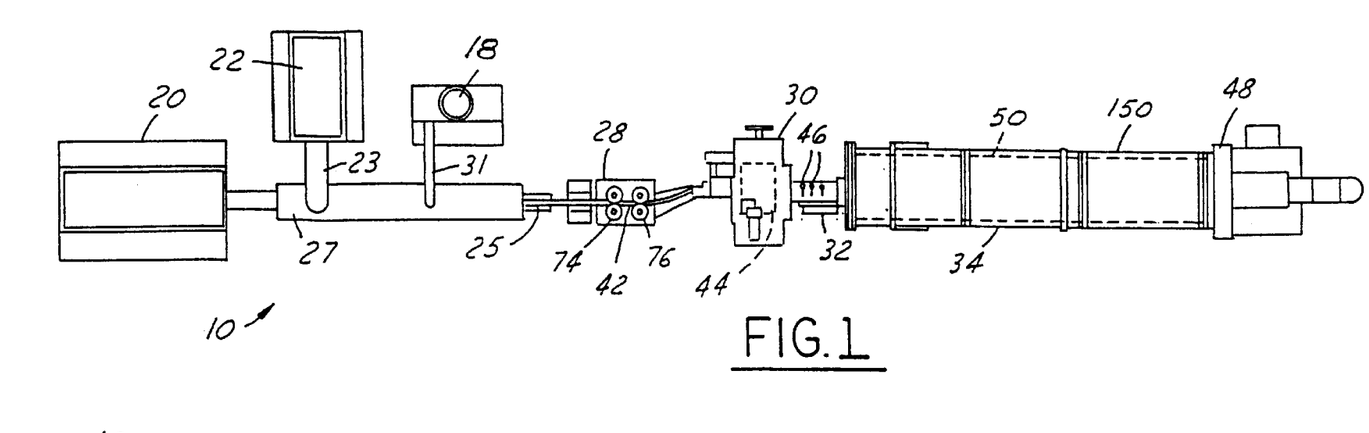
FIG. 1 is a schematic top view of a confectionery forming process and system in accordance with one embodiment of the present invention.
Figure 2:
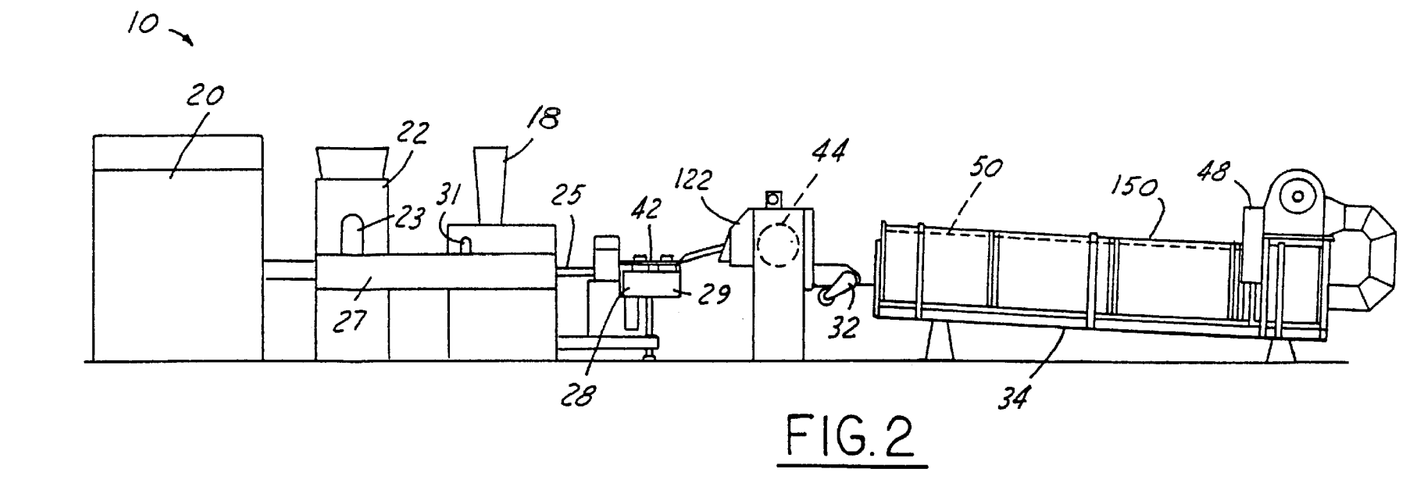
FIG. 2 is a side view of the system and process illustrated in FIG. 1.

A system for making center-filled candy lollipops in accordance with a preferred embodiment of the present invention is shown in FIGS. 1 and 2 and referred to by the reference numeral 10. FIG. 1 is a top elevational view of the system and FIG. 2 is a side elevational view of the system shown in FIG. 1.

For illustrative purposes, the present invention will be particularly described relative to the formation of lollipop candy products. However, it is to be understood that the present invention can be utilized to form any three-phase candy product and is not limited to the formation of lollipop or gum-type candy products. For example, the outer layer can be a hard candy of one flavor and one color, or it can even be transparent. The middle or second (inner) layer can be made of either a hard or chewy material, and can have a second flavor and second color. The middle layer can also be made of a gum or bubble-gum material which is one of the preferred embodiments of the present invention. The center layer or core can be any high viscosity fluid material, such as a gel, or any semi-liquid material.

As shown in FIGS. 1 and 2, the lollipop system 10 as shown includes a first extruder 20, a second extruder 22, a pumping system 18 for the center-filled semi-liquid portion, a rope sizing mechanism 28, a lollipop forming machine 30, a conveyor apparatus 32, and a cooling device or mechanism 34.

Figures 5, 6:
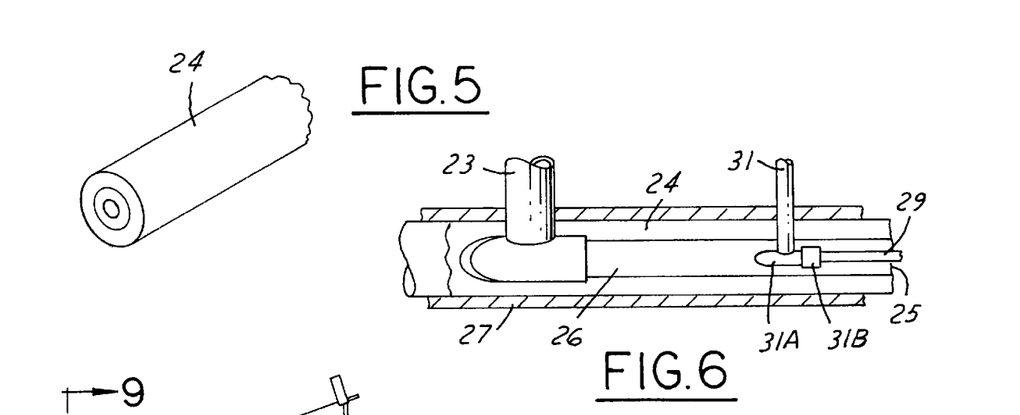
FIG. 5 illustrates the rope of three-component co-extruded product in accordance with the present invention.
FIG. 6 is a cross-section of a portion of the system shown in FIGS. 1 and 2, the cross-section being taken along lines 6—6 in FIG. 1.

The extruder 20 is utilized to form the outer layer 24 of the co-extruded material 25 (see FIG. 5). The extruder 22 is utilized to form the center or core gum material 26 of the co-extruded material 25. As shown in FIGS. 1, 2, and 6, the gum material is extruded from extruder 22 through barrel 23 directly into barrel 27 on extruder 20. As the candy material 24 is extruded through barrel 27, the gum material is inserted into the center thereof through barrel 23, which protrudes into barrel 27.

The core of gum material 26 is filled with a semi-liquid type material 29 from the pumping mechanism 18. The semi-liquid material 29 is inserted or injected into the gum material through conduit 31 which also is attached to barrel 27 of the extruder 20.

Thereafter, the "rope" of composite three-phase material 42 travels along the sizing mechanism 28 where sets of sizing rollers reduce and form it into the final size and shape for entry into the lollipop forming machine 30. A rotating drum mechanism 44 (described in more detail below) forms the three-phase candy/gum/semi-liquid-fill rope of material into individual pieces of candy and inserts lollipop sticks into each of the pieces. The lollipop products 46 are then ejected from the forming machine 30 onto the conveyor mechanism 32 which conveys them to the cooling tunnel 34. The cooling tunnel has a rotating barrel 50 in which air is circulated in order to cool and harden the final lollipop products. A motor 48 is used to rotate the barrel 50 of the cooling tunnel 34.

Figure 3:
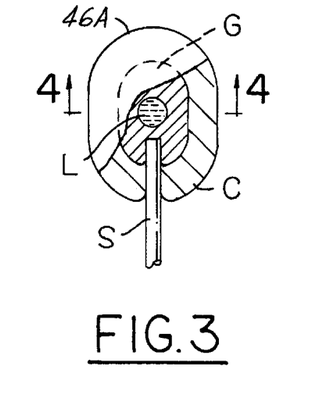
FIG. 3 schematically illustrates a final center-filled lollipop product made in accordance with one embodiment of the present invention, the product being shown in partial cross-section.
Figure 4:
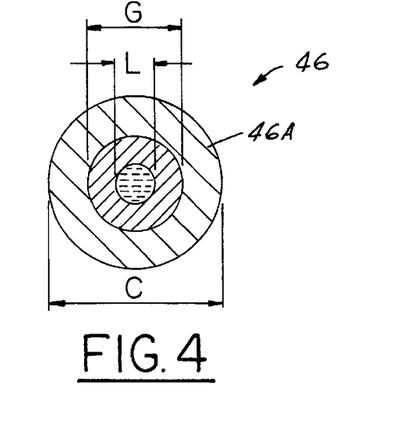
FIG. 4 is a cross-section of the lollipop product as shown in FIG. 3, the cross section being taken along line 4—4 in FIG. 3.

Products made in accordance with the lollipop embodiment of the present invention are shown schematically in FIGS. 3 and 4. The candy lollipop products 46 are three-phase products, that is they have three distinct layers of three different materials. As shown in FIGS. 3 and 4, the lollipop products 46 include a semi-liquid center L (typically of jelly-like consistency), a second layer of soft gum or bubble gum material G and a hard outer layer of candy material C. A lollipop stick S, which is inserted into the three-phase product during the forming process forms the completed lollipop product.

The gum material which is to be extruded from the extruder 22 is first formed by any conventional process, such as in batches in kettles. Gum products made by a batch process are typically made in a sigma blade kettle mechanism. Gum processes of this type are disclosed, for example, in U.S. Pat. Nos. 4,329,369 and 4,968,511. It is also possible to provide gum or bubble gum material which is made by an extrusion process in a continuous mixer. Processes of this type are shown, for example, in U.S. Pat. Nos. 5,045,325 and 5,135,760.

The gum material for the candy lollipop is transferred from the kettle into inlet or opening 22A in the extruder mechanism 22. In the extruder 22, the gum material is further mixed and conveyed by a rotating screw mechanism along barrel 23. In the system in accordance with the present invention, the gum or bubble gum material has generally a circular cross-section in barrel or tubular member 23, where in turn, it is extruded into the barrel 27 of extruder 20.

The material for the semi-liquid center-fill phase of the lollipop product is made in any conventional manner and transferred to pumping mechanism 18. The liquid center-fill material typically has a syrup-like or jelly-like consistency. The center-fill material is cooled and has flavoring and coloration added as desired. The center-fill material is then transferred through conduit 31 where it is injected into the center of the extruded gum material.

The conduit 31 typically has a water-cooled jacket around it (not shown) in order to keep the temperature of the semi-liquid material within a certain temperature range, such as 40–50° C. The barrel 27 of the co-extrusion system also preferably has a cooling jacket around it for the same purpose. Water or low-pressure steam of about 80–100° C. can be used.

The semi-liquid material used for the center-fill of the gum material is passed through conduit or tube 31 into barrel 27 of extruder 20. The semi-liquid material is discharged from the end 31A of tube 31 into the gum material. An enlarged head 31B on the discharge end 31A creates a defined space or cavity of slightly increased size in the extruded gum material which allows the extruded semi-liquid-fill material to form a consistent and distinct phase layer in the gum material. Not only does this provide a defined area for the semi-liquid-fill material, but also creates a circular cavity for the semi-liquid material to fill.

Figure 7:
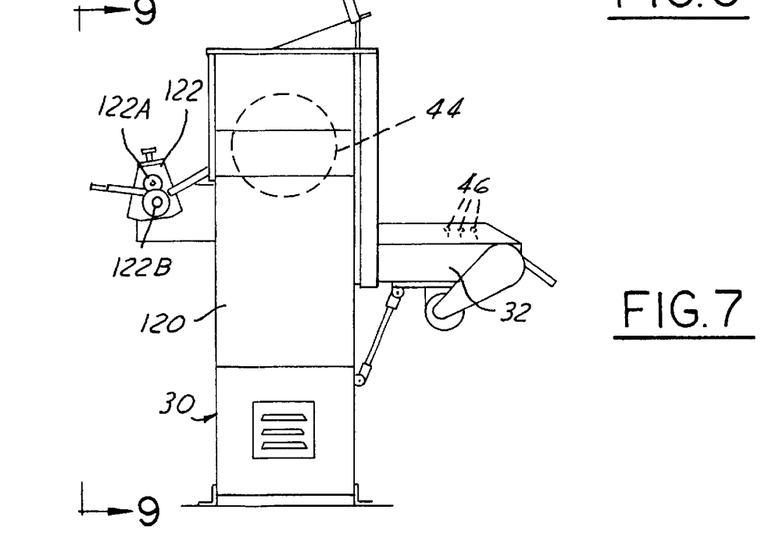
FIGS. 7, 8, and 9 are side, top, and front views, respectively, of one form of lollipop forming mechanism for use with one embodiment of the present invention.
Figure 8:
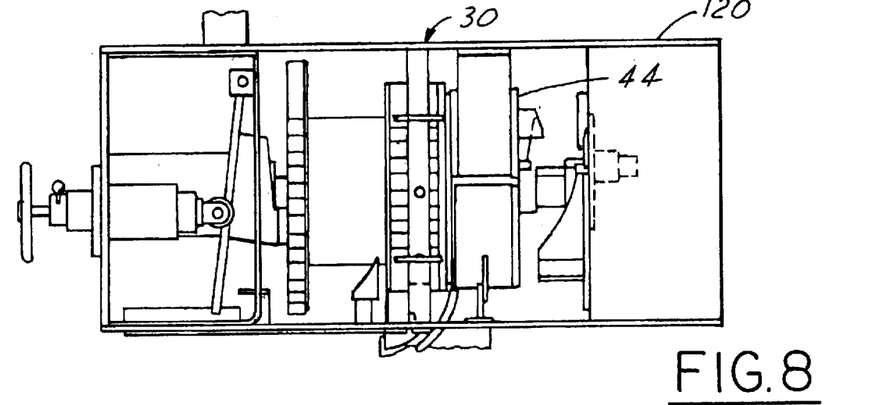
Figure 9:
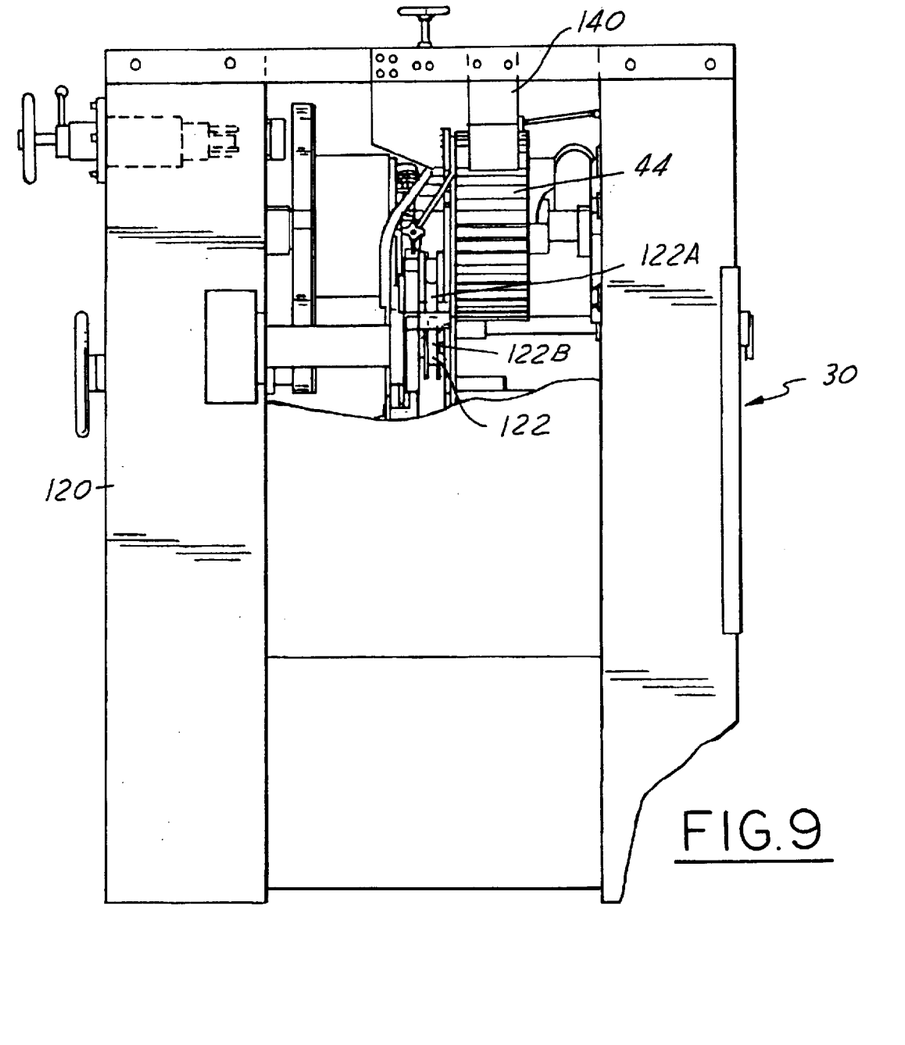
Figure 10:
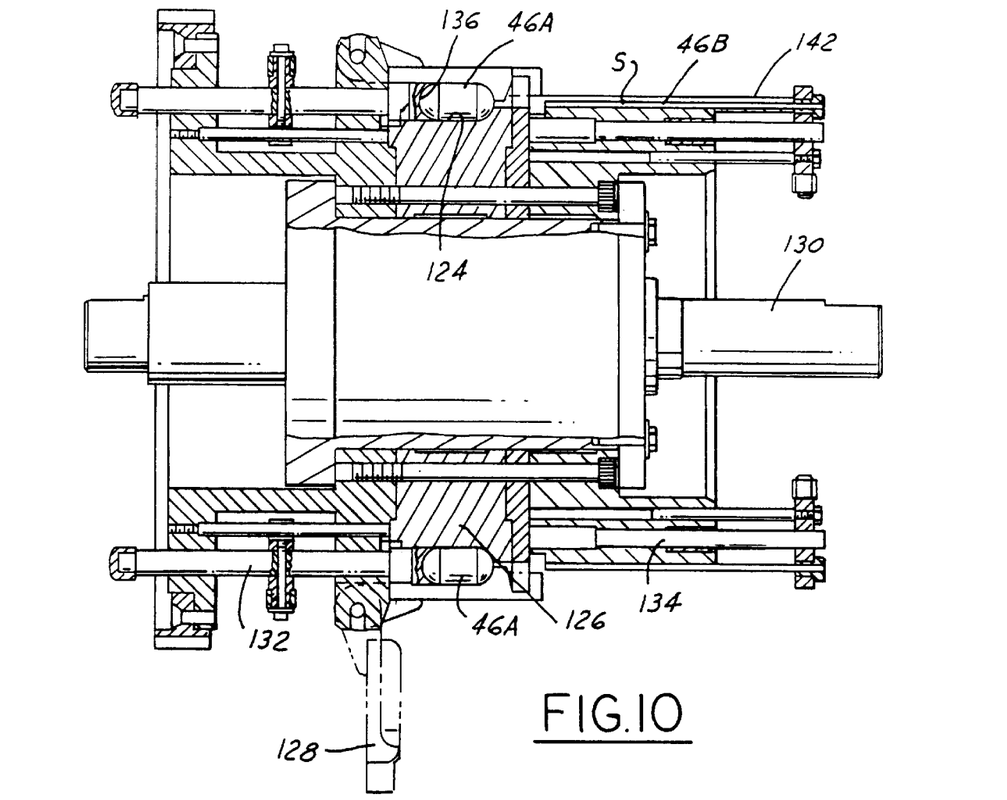
FIG. 10 is a partial cross-sectional view of a lollipop forming head mechanism in accordance with one embodiment of the present invention.
Figure 11:
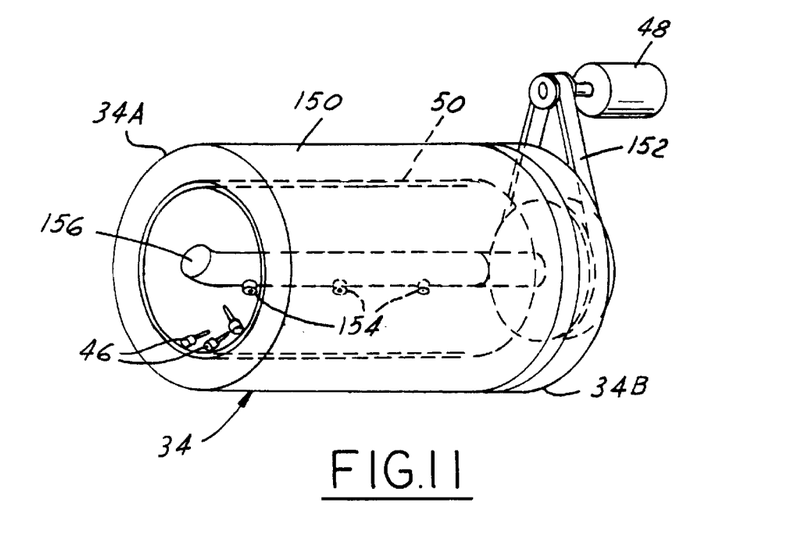
FIG. 11 is a schematic diagram of a rotating cooling tunnel for use with the present invention.

One lollipop forming mechanism 30 which can be utilized with the present invention is shown in FIGS. 7, 8, and 9. Details of the rotating drum mechanism are shown in FIG. 10. The lollipop forming machinery can be provided, for example, from Latini or another company which make similar products and are available in the marketplace. In this regard, Model BLP-4 ball lollipop forming machine from Latini Machine Company can be utilized for this purpose. In general, the lollipop forming machinery 30 includes a housing 120, a feeder/sizer mechanism 122, a rotating drum 44, and a conveyor mechanism 32.

In accordance with the lollipop-forming machine 30, a rope of material, such as solid candy material is passed through a feeder/sizer mechanism 122 and around a rotating drum 44 which includes a plurality of forming dies 124. The feeder/sizer mechanism 122 includes a pair of vertically positioned roller members 122A and 122B (see FIG. 7) which convey the rope of material in an appropriate thickness where it is positioned in the forming dies 124.

The forming dies 124 include a series of semi-circular grooves around the outer periphery of a rotating ring member 126 and a plurality of semi-circular groove members 128 which are hinged to the drum member 44 in order to allow entry of the extruded material into the groove members 124 and allow ejection thereof after the final products are formed.

The drum member 44 rotates around a central spindle 130 and also includes a plurality of cam-operated plunger members 132 and 134 which are positioned on opposite sides of the semi-circular die grooves. When the hinged die groove member 128 is positioned adjacent the die groove members 124, an oval shaped cavity 136 is formed and in which the candy material is positioned to be formed in the same shape. The lollipop sticks S (46B) are positioned in a stick magazine or hopper 140 and automatically dispensed one by one into a stick inserting channel 142 adjacent the drum mechanism 44. A separate plunger member (not shown) pushes the lollipop stick S axially or longitudinally and inserts it into the semi-solid formed candy portion 46A of the lollipop. In this regard, as shown in FIG. 6, the stick member S is only inserted into the candy portion C and gum portion G of the lollipop 46. This maintains the integrity of the gum seal around the liquid center-filled portion L and prevents the liquid material from leaking from the candy portion 46A and/or creating an unacceptable commercial product.

The lollipop products 46 are ejected from the lollipop forming machines 30 or 180 into the conveyor mechanism 32 where they are conveyed into the cooling mechanism 34. Preferably, the lollipops are formed with a small piece of candy material between them, holding them together in a continuous string of pops. The string of pops fall off as the die drum rotates, allowing the pops to fall onto the conveyer belt positioned below the forming dies. The cooling tunnel 34 includes an outer housing 150 and a central rotating cage member 50. The cage member 50 is rotated by motor 48 and belt drive 152.

Air is injected through openings or ports 154 in tube or passageway 156 which is positioned in the center of the rotating drum 50. The final products 46 are tumbled and cooled in the cooling tunnel 34 as they progress from the entrance end 34A to the exit end 34B. If the individual candy products are not separated when they enter the cooling tunnel, the tumbling will separate them into individual products. The tumbling also helps in maintaining a better and more uniform round shape for the final products. The continuous movement of the formed products in the cooling mechanism prevents deformation of their shape. The final products are either transported to storage for later processing, or sent directly for packaging and subsequent shipping to customers.

Figure 13:
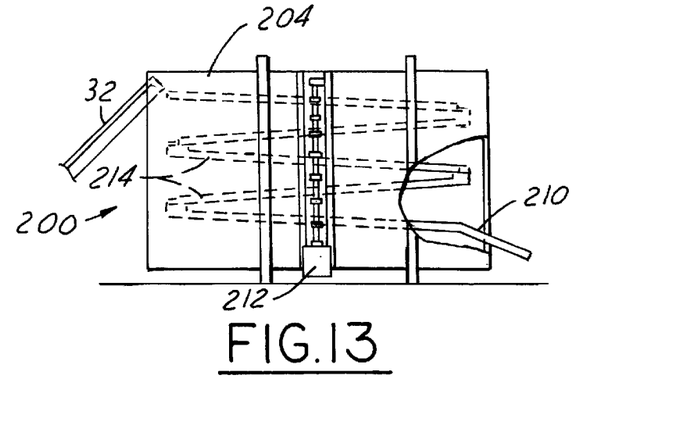
FIGS. 13 and 14 depict another preferred cooling mechanism for use with the present invention.
Figure 14:
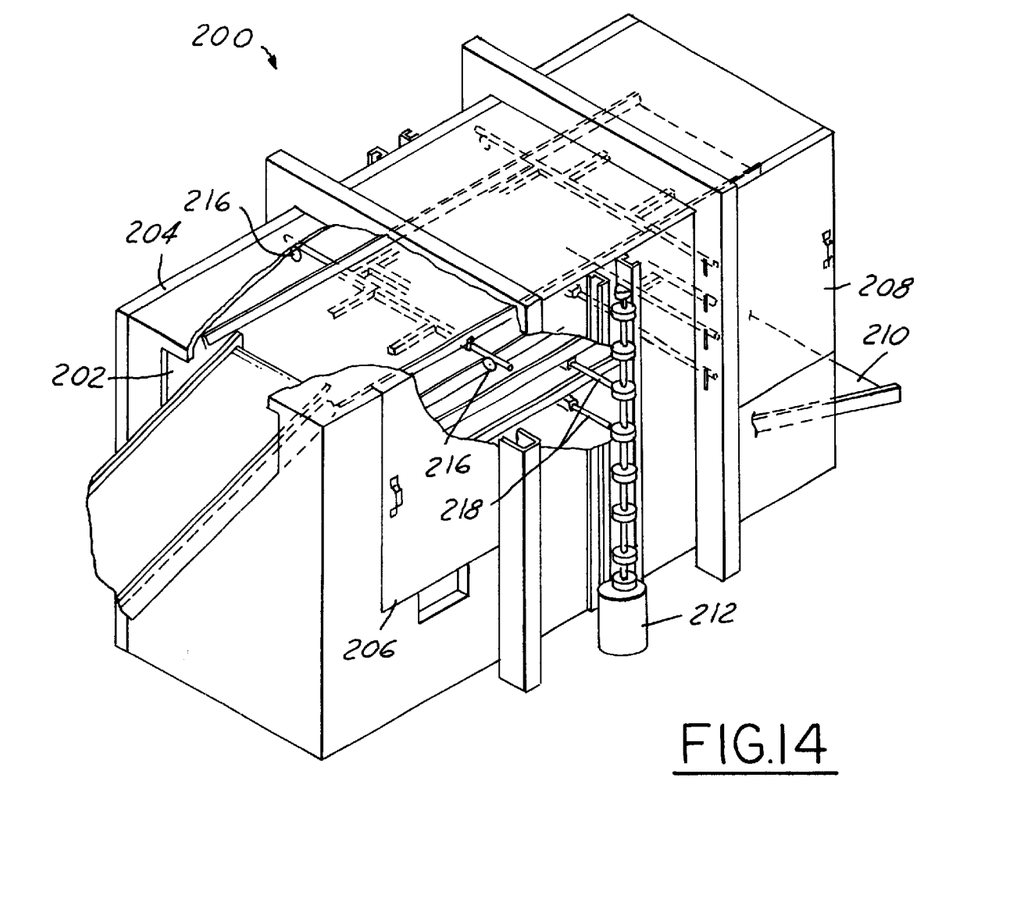

An alternate preferred cooling mechanism 200 is shown in FIGS. 13 and 14. The cooling mechanism 200 can be, for example, the type marketed by Aquarius Holland, such as Model No. BC1. The cooling mechanism 200 can be used in place of the cooling tunnel 34. It has the same purpose and is used in the same manner. The cooling mechanism 200 is positioned immediately following the forming machine 30. Conveyor mechanism 32 transports the lollipops or other formed candy products into opening or entrance 202 in housing 204.

The housing 204 is made of, for example, sheet metal, in the size and shape generally shown in the drawings and has a pair of maintenance doors 206 and 208, an exit opening 210, and a motor controlled screw cam mechanism 212. Air is introduced into the housing and used to cool the formed products. A plurality of slanted tray members 214 are positioned inside the housing. The tray members are positioned on moveable wheel members 216 which allow the tray members to oscillate side to side in the housing. Post members 218 are connected to each of the tray members with outer ends operatively connected to the screw cam mechanism 212. Thus, as the screw cam rotates, the tray members oscillate quickly side to side. This in turn causes the candy products on the trays to be shaken, tumbled and rolled on the tray members which allows them to cool uniformly and prevent deformation.

The plurality of tray members 214 in the housing are slanted alternately in opposite directions (as shown in FIG. 14) so that the products can travel back and forth in the housing. The products are shaken and travel along the length of the uppermost tray, drop onto the tray positioned immediately below, and move in that manner repeatedly to the bottom tray in the housing where they exit through opening 210. The products exiting the cooling mechanism 200 are collected into boxes or containers (not shown) for transport to storage for later processing, or transported directly for packaging and subsequent shipment to customers.

The rope sizing mechanism 28 includes a flat surface on which a plurality of pairs of sizing rollers 74 and 76 are positioned. A roller cluster can be positioned at the entrance end of the sizing table, although it is also possible to have a pre-sizing mechanism attached to the end of the batch forming mechanism, as explained above. The rope sizing mechanism 28 includes a table member 29 having a plurality of roller members thereon which convey and accurately size the cross-sectional diameter of the three-phase extruded rope product for entry into the lollipop forming mechanism 30.

Preferably one set of cluster rollers and two pairs of flat rollers are used to properly size the rope of material. In this regard, the gum material can be reduced in size to 2.00 inches in diameter in the cluster rollers, to 1.50 inches in the first pair of flat rollers, and to 1.25 inches in the second pair of flat rollers. The infeed rollers on the forming machine can further slightly reduce the diameter to a final size of 1.20 inches.

As indicated above, the present invention can be utilized to form a wide variety of three-phase candy products, with the center phase or core being a high viscosity fluid or semi-liquid material. Although sticks can be added turning the candy products into lollipops, the three-phase products can be formed without sticks and can be packaged and sold in the same manner as any other candy product.

Also, the outer layer does not have to be a hard candy. Not only can the outer layer or shell consist of a sugar or sugar-free hard candy, it can consist of a sugar or sugar-free chewy candy, a toffee or caramel, or even a separate gum or bubble gum layer. The middle part or inner layer can also be a sugar or sugar-free hard or chewable candy, a toffee or caramel, or a gum or bubble gum material. The filling or center core can be, for example, any high viscosity or semi-liquid material such as a liquid water-base filling with various viscosities, a fat base cream, a confectionery gel, a fruit jam, a nut paste, a chocolate material, a milk based confectionery, or a caramelized milk-based confectionery.

Figure 15:
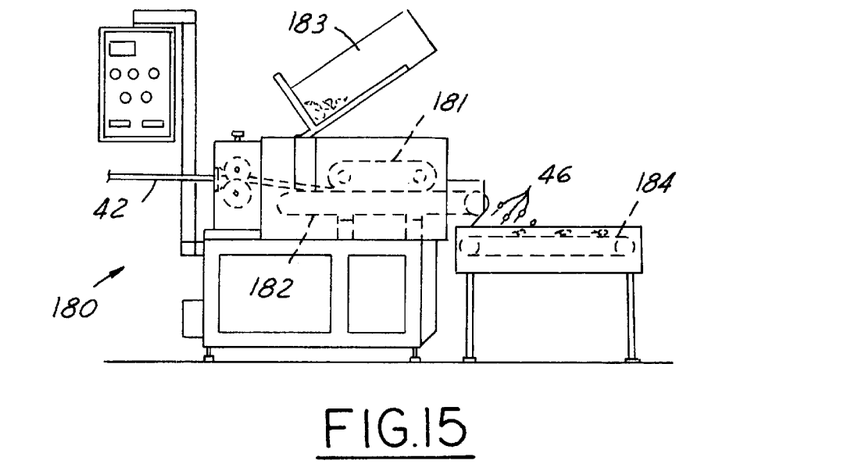
FIGS. 15 and 16 depict another three-phase candy forming mechanism which can be utilized with the present invention.
Figure 16:
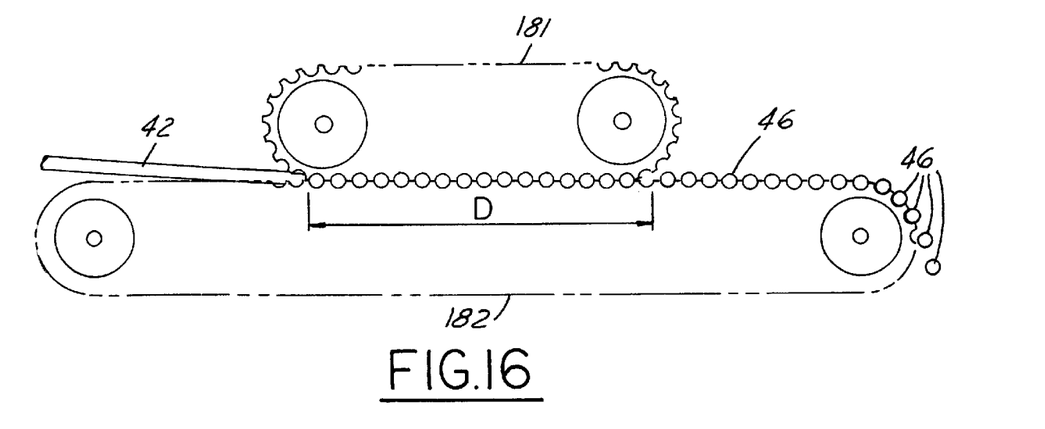

Another forming mechanism which can be used with the present invention is chain-forming mechanism 180 (shown in FIGS. 15–16). This mechanism 180 uses a pair of rotating chain members instead of a rotating die drum member as provided in the Latini machine. A chain-forming mechanism which can be utilized is available from Euromec in Italy. The chains each have sets of semi-circular die grooves on them which come together on the three-phase rope of material to cut and form it into separate balls or pieces of semi-molten candy material. Lollipop sticks can be inserted into the balls of candy in the Euromec mechanism, if desired, and the final products are ejected onto a conveyer mechanism. Another company with a lollipop forming mechanism or machine which can be utilized in the present invention is Robert Bosch GmbH in Germany.

A representative chain-forming machine 180 of this type is generally shown in FIG. 15. The forming machine 180 incorporates two mating rotating chains 181 and 182—as better shown in FIG. 17—to form the candy products (rather than a rotating drum member as discussed above). Each of the two rotating chains has one portion of the completed forming die which is used to form the final shape of the lollipop. The rope of gum 42 is fed into the intersection where the two chains come together as they rotate. The two portions of the individual forming dies mate together at that point severing the rope of material and forming the separate piece into an oval tablet shape (or the shape of the forming die). The two die portions travel together in their mated closed position for a certain portion "D" of the length of the chains. This sets the final shape of the individual tablet products and, when the products are to be formed into lollipops, lollipop sticks can be inserted from one side from an optional stick hopper 183.

As the chains separate after the forming process, the formed products 46 drop from the forming machine onto a conveyor 184 where they are transported into a cooling and tumbling mechanism, such as cooling mechanism 34 or 200.

With any of the various forms of the present invention, a stable center-filled product is provided. The semi-liquid center-fill is effectively housed in a gum or bubble gum core or shell which in turn is surrounded by a hard candy shell. The three layers of material form a stable product that does not leak.

The formula for semi-liquid center-fill material used with the present invention has a high percentage of Pectin which helps prevent the center-fill from passing through the gum or bubble gum material and thus leaking from the final product. The amount of Pectin is on the order of 1.0–1.3 percent by weight of the final product which helps prevent the semi-liquid fill from gelling. Also, the gum and center-fill material L are kept at a lower temperature, on the order of less than 50° C., which also prevents the semi-liquid material from gelling or decreasing in viscosity.

During the process in accordance with the present invention, it is important to maintain the temperatures of the materials L, G, and C within appropriate ranges. "Plastic" states of the candy, chewy material, and semi-liquid center-fill materials are necessary when the lollipop stick S is inserted in order to prevent puncture of the semi-liquid material and subsequent leaking. These temperatures are below the glass transition temperatures at which the materials will turn into solids and above the flow temperature at which the temperatures will turn the materials into flammable liquids. An example of a formula of material for a flavored center-fill layer L is as follows:

| Materials | % Weight |
| --- | --- |
| Granular Sugar | 10–16% |
| Water | 12–18% |
| High Fructose | 45–55% |
| Glycerin | 14–18% |
| Pectin Solution | 0.3–0.4% |
| Citric Acid | 5–8% |
| Color No. 1 | 0.002–0.003% |
| Color No. 2 | 0.00004–0.00005% |
| Flavor | 0.6–0.8% |

The Pectin is mixed in gently with the Glycerin. The mixture of corn syrup, sugar, water and Glycerin (containing Pectin) is then cooked to 109–110° C. The mixture is then cooled to 80–85° C. and the acid, color and flavor are added. The material has a jelly-like consistency. The amount of Pectin thickens the semi-liquid center-fill material sufficiently to prevent it from passing through any cracks or voids in the center of the gum product where it can migrate and pass to the outside creating difficulties in the lollipop forming process and creating unacceptable final products.

Figure 12:
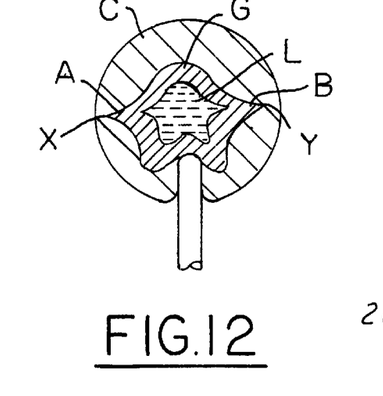
FIG. 12 is a cross-section of a lollipop product made in accordance with one embodiment of the present invention.

One of the factors relative to producing acceptable liquid center-filled candy products is the prevention of leaking of the liquid material L from the center of the extruded rope when the semi-circular dies come together forming the candy portions 46A. The edges of the circular dies come together compressing the extruded rope at portions X and Y as shown in FIG. 12. The center chewy, gum or bubble gum material G is also squeezed at both ends forming flattened portions A and B. The maintenance of the liquid portion L at a thicker composition, such as with increased amount of Pectin in the formulation, assists in preventing the semi-liquid center-fill material L from being squeezed out the joint or seam along portions A and B at points X and Y of the candy shell C.

Representative examples of formulas and mixing processes for a bubble-gum material for use in the gum G portion of a three-phase flavored lollipop product and a candy material for use in the candy C portion, are as follows:

| Gum | |
| --- | --- |
| | % By Weight |
| Corn Syrup | 13–17 |
| Gum base blend | 18–22 |
| Sugar | 60–63% |
| Citric Acid | 0.70–1.1 |
| Color No. 2 | 0.02–0.04 |
| Glycerin | 0.45–0.65 |
| Corn Oil | 0.15–0.35 |
| Flavor | 0.8–1.2 |
| Talc | 0.4–0.6 |

The corn syrup, gum base blend and talc are inserted into a batch-type kettle mixer and mixed for a minimum of one minute with the mixing blades rotated in one direction and mixed for a minimum of three minutes with the blades rotated in the opposite direction. The kettle temperature is kept at approximately 120° F. with the jacket at a temperature of 120° C. The final gum base temperature is 85–95° C. and the gum drop temperature is 46–50° C. The sugar, the citric acid and blue coloring are then added to the kettle and the mass is further mixed for at least three minutes. The glycerin is then added during the mixing process and the mass is continued to be mixed with the blades rotating for at least one-half a minute in each direction. The corn oil and flavor are added at the end and the mixing is continued for several more minutes. If desired, the sugar can be split into two portions and added at different points in the process in order to change the texture of the final gum product.

The candy material is primarily granulated sugar (about 55.0% dry) and glucose syrup (about 45.00% dry). Water is added as the ingredients are inserted into a cooking pot. The color solution is added after the candy is cooked and is about 1.33% FD&C Color #2, 0.33% FD&C Color #40, and 98.33% spring water. The candy base is then cooled to about 140° C. The flavor portion is premixed and comprises flavor, malic acid and citric acid in ratio amounts of 0.08, 0.12, and 0.8, respectively. The cooked candy is poured onto the extruder 20 and the flavor premix is added into the extruder and kneaded into the candy.

A representative final three-phase candy product can have a final total weight of about 20 grams. The weight comprises 4.3 grams of gum, chewy material or hard candy G, 0.7 grams of semi-liquid-fill L, and 15.0 grams of hard candy C. Another preferred ratio of the ingredients is 60% by weight of the hard candy shell, 30% by weight of the middle layer material, and 10% by weight of the center fill material.

The processing parameters and procedures for a representative process and system in accordance with the present invention can be set forth in the following description. The gum material has a temperature of 39–42° C. when it enters the extruder—and an exit temperature of 46° C. The head temperature is at 63° C. and the barrel temperature is at 120° C. The extruder speed is 14 rpm. The liquid-center fill temperature is 43° C. and it is injected into the gum material at 1400 psi. The candy temperature inside the extruder is controlled to about 93–96° C. The rope sizer 28 has a speed of 50 rpm and the sizes of the spaces between the flat rollers in the three sizing roller sections is 1.50 inches and 1.25 inches. The speed of the cooling drum is 80 rpm and the angle of the drum is 30 from horizontal.

The present invention makes it possible to co-extrude two confectionery products with filling in the center. The multiple extruded confectionery rope can be scaled down to the required diameter by a conventional rope-sizing machine. The scaled rope can be formed into separate products (or "tablets") on a rotary or chain-type plastic-former or lollipop-forming machine. If the texture of the center filling is sufficiently firm for cutting, the filled rope can also be formed into individual pieces or tablets by using a conventional "cut and wrap"-type machine.

With the present invention, the ratios of the components can be controlled and maintained within ±10%. This is an improvement over conventional processes which have a wider range of components ratios. Thus, product consistency and efficiency can be achieved more easily. Also, the possibility and chances of human error during operation are minimized and possibly eliminated.

The present invention also simplifies the existing processes used for combining two components into ropes for tablets. With the present invention, it is possible to combine three components of various textured confections and form unique candy (confectionery) products. Since the inventive system is more of a closed and self-contained system, the temperatures of the various components essential to maintain the requisite ratios of the components are not dependent of outside weather conditions.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method of making a three-phase confectionery product having an outer shell layer of a first candy material, a middle layer of a second candy material, and an inner core of a semi-liquid material, said method comprising the steps of:

extruding a first layer of a first candy material from a first extruder, said first layer of a first candy material forming the outer shell layer of the confectionery product;

extruding a second layer of a second candy material from a second extruder into said first layer of said first candy material, said second layer of said second candy material forming the inner middle layer of the confectionery product;

injecting into said second layer a third layer of a third candy material, said third candy material being a semi-liquid material and said third layer forming the center core of the confectionery product.

2. The method as set forth in claim 1 further comprising the step of forming the three-phase confectionery product into individual candy tablets.

3. The method as set forth in claim 2 wherein said step of forming the three-phase confectionery products into individual candy tablets is performed on a rotary-type forming machine.

4. The method as set forth in claim 2 wherein said step of forming the three-phase confectionery products into individual candy tablets is performed on a chain-type forming machine.

5. The method as set forth in claim 1 wherein said first candy material forms a hard outer shell on the confectionery product.

6. The method as set forth in claim 1 wherein said second candy material forms a hard inner middle layer in the confectionery product.

7. The method as set forth in claim 1 wherein said first candy material and said second candy material have different flavor ingredients.

8. The method as set forth in claim 1 wherein said first candy material is a transparent material, and wherein when said confectionery product is formed, said second candy material forming said inner middle layer is visible through said outer shell layer.

9. The method as set forth in claim 1 wherein said second candy material is a chewable material.

10. The method as set forth in claim 9 wherein said second candy material is a gum material.

11. The method as set forth in claim 9 wherein said second candy material is a bubble gum material.

12. The method as set forth in claim 1 wherein said third candy material is a material selected from the group consisting of a liquid water-base material, a fat base cream, a confectionery gel, a fruit jam, a nut paste, a chocolate material, a caramelized milk-based confection, and a milk-based confection.

13. The method as set forth in claim 2 further comprising the step of inserting a lollipop stick into each of the candy tablets.

14. The method as set forth in claim 2 further comprising the step of cooling said individual candy tablets.

15. The method as set forth in claim 2 further comprising the step of cooling and tumbling said individual candy tablets.

16. The method as set forth in claim 13 further comprising the step of cooling said candy tablets with the lollipop sticks in them.

17. The method as set forth in claim 13 further comprising the step of cooling and tumbling said candy tablets with the lollipop sticks in them.

18. A system for making a three-material lollipop product, said system comprising:

a first extruder with a barrel for extruding a candy material;

a second extruder for extruding a gum material, said gum material being extruded into said candy material;

a semi-liquid-fill mechanism for adding a semi-liquid material to said gum material and forming a rope of three-layer material including a center layer of the semi-liquid material, an intermediate layer of the gum material, and an outer layer of the candy material;

a sizing mechanism for sizing the rope of three-layer material; and a lollipop forming mechanism for forming the rope of three-layer material into lollipop tablets, said lollipop forming mechanism inserting stick members into each of the lollipop tablets to form individual lollipop products.

19. The system as recited in claim 18 further comprising a conveyer mechanism and a cooling mechanism, said conveyer mechanism positioned to transport said lollipop products into said cooling mechanism.

20. The system as recited in claim 18 wherein said semi-liquid fill mechanism is added to said gum material in said barrel of said first extruder.

21. The system as recited in claim 18 further comprising a semi-liquid material conduit in said barrel, said semi-liquid material being added to said gum material through said conduit.

22. The system as recited in claim 19 wherein said cooling mechanism comprises a rotating tunnel member which tumbles the lollipop products therein and wherein cooling air is supplied to said cooling mechanism in order to cool and harden the lollipop products.

23. The system as set forth in claim 19 wherein said cooling mechanism comprises a housing, a plurality of tray members in the housing, and means for shaking said tray members in order to tumble said lollipop products.

24. The system as set forth in claim 23 further comprising means for circulating air through said housing in order to harden said lollipop products.

25. The system as set forth in claim 18 wherein said lollipop forming mechanism comprises a housing with a rotating drum member, said drum member having a plurality of tablet forming die members thereon.

26. The system as set forth in claim 18 wherein said lollipop forming mechanism comprises a housing with a pair of rotating chain members, said rotating chain members each having a plurality of tablet forming dies thereon.

27. The system as set forth in claim 26 wherein said pair of rotating chain members includes a first chain member with a first plurality of partial die members thereon and a second chain member with a second plurality of partial die members thereon, said first and second plurality of partial die members meeting together forming completed tablet forming dies for said lollipop products as the first and second chain members rotate.

28. A method of making a three-material confectionery product, said steps comprising:

extruding a first candy material from a first extruder;

extruding a second candy material from a second extruder into said first candy material;

injecting a center-fill semi-liquid material into said second candy material forming a three-phase rope of confectionery material; and forming individual pieces of the confectionery product from said rope of material in a forming mechanism.

29. The method as set forth in claim 28 further comprising the step of sizing said rope of material in a sizing mechanism prior to forming said individual pieces of confectionery product.

30. The method as set forth in claim 28 further comprising the step of inserting lollipop sticks into each of said pieces of confectionery product to form lollipop products.

31. The method as set forth in claim 30 further comprising the step of cooling and tumbling said formed lollipop products.

32. The method as set forth in claim 28 wherein said forming mechanism is selected from the group consisting of a chain-type forming mechanism, a rotary-type forming mechanism, and a cut-and-wrap-type forming mechanism.

* * * * *